US 9,507,499 B2

(12) United States Patent
Figueroa

(10) Patent No.: US 9,507,499 B2
(45) Date of Patent: Nov. 29, 2016

(54) SYSTEM FOR VIEWING IMAGE FRAMES BASED ON GEOGRAPHICAL LOCATION

(71) Applicant: MICROSOFT TECHNOLOGY LICENSING, LLC, Redmond, WA (US)

(72) Inventor: Joseph Figueroa, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 576 days.

(21) Appl. No.: 13/943,694

(22) Filed: Jul. 16, 2013

(65) Prior Publication Data
US 2013/0305157 A1    Nov. 14, 2013

Related U.S. Application Data

(63) Continuation of application No. 12/114,825, filed on May 5, 2008, now Pat. No. 8,522,143.

(51) Int. Cl.
*G06F 3/00* (2006.01)
*G06F 3/0484* (2013.01)
*G06F 3/0481* (2013.01)
*G06F 17/30* (2006.01)

(52) U.S. Cl.
CPC .......... *G06F 3/0484* (2013.01); *G06F 3/0481* (2013.01); *G06F 17/30241* (2013.01); *G06F 17/30817* (2013.01); *G06F 17/30852* (2013.01)

(58) Field of Classification Search
CPC ..................... G06F 17/30241; G06F 3/04842; G06F 3/048; G06F 3/0425; G01C 11/02
See application file for complete search history.

(56) References Cited

U.S. PATENT DOCUMENTS

| 5,247,356 | A  | * | 9/1993  | Ciampa ............... G01C 11/02 348/135 |
| 5,768,447 | A  |   | 6/1998  | Irani et al. |
| 6,714,215 | B1 |   | 3/2004  | Flora et al. |
| 6,998,987 | B2 |   | 2/2006  | Lin |
| 7,254,249 | B2 |   | 8/2007  | Rhoads et al. |
| 7,460,148 | B1 |   | 12/2008 | Clark et al. |

(Continued)

OTHER PUBLICATIONS

Christel, et al., "Interactive Maps for a Digital Video Library", Proceedings of IEEE International Conf. on Multimedia Computing and Systems, Jul. 1999, vol. 1, 9 pages.

(Continued)

*Primary Examiner* — Alvin Tan
*Assistant Examiner* — Ayesha Huertas Torres
(74) *Attorney, Agent, or Firm* — John Jardine; Dan Choi; Micky Minhas

(57) ABSTRACT

Systems, methods, and computing devices are provided for viewing scene-granular video based on geographical location. The computing device may include a memory configured to store video and geographical coordinates at which the video was captured. The computing device may further include, a processor that is configured to execute a video path viewing program, and a display that is configured to display a graphical user interface of the video path viewing program. The graphical user interface may be configured to display a path graphic spatially representing the geographical coordinates along which the video was captured, a location selector that is selectively movable along the path graphic to a selected path location, and a video icon that is configured to display a preview of a portion of the video corresponding to the selected path location.

18 Claims, 6 Drawing Sheets

(56) References Cited

U.S. PATENT DOCUMENTS

| | | |
|---|---|---|
| 7,620,496 B2 | 11/2009 | Rasmussen |
| 2006/0026170 A1 | 2/2006 | Kreitler et al. |
| 2006/0075442 A1* | 4/2006 | Meadow ............ G06F 17/30241 725/91 |
| 2007/0070069 A1 | 3/2007 | Samarasekera et al. |
| 2007/0112729 A1 | 5/2007 | Wiseman et al. |
| 2007/0244634 A1 | 10/2007 | Koch et al. |
| 2007/0258642 A1 | 11/2007 | Thota |
| 2007/0273558 A1 | 11/2007 | Smith et al. |
| 2008/0307311 A1 | 12/2008 | Eyal |

OTHER PUBLICATIONS

"GeoMovie", Magic Instinct Software, Retrieved at <<http://www.justmagic.com/GeoMovie_US.html >>, Accessed Feb. 4, 2008, 6 pages.

Navarrete et al., "VideoGIS: Segmenting and Indexing Video Based on Geographic Information", 5th AGILE Conference on Geographic Information Science, Apr. 2002, 9 pages.

"WikiMap—Geographical Wiki", SourceForge.net, Retrieved as <<http://sourceforge.net/projects/wikimap/ >>, Accessed Feb. 4, 2008, 2 pages.

* cited by examiner

SYSTEM FOR VIEWING IMAGE FRAMES BASED ON GEOGRAPHICAL LOCATION

CROSS-REFERENCE TO RELATED APPLICATIONS

This application is a continuation of U.S. patent application Ser. No. 12/114,825 filed May 5, 2008 and titled "SCENE-GRANULAR GEOGRAPHICAL-BASED VIDEO FOOTAGE VISUALIZATONS", the entire disclosure of which is hereby incorporated by reference for all purposes.

BACKGROUND

Finding a particular digital video clip saved in mass storage and loaded in memory containing multiple video files is difficult. The difficulty is made worse by multiple video clips that are often captured in a single video file. To find a particular video clip, a user may have to open multiple video files and view all, or a portion of, each video to find a particular clip. Such an approach is time consuming and may cause the user to give up the search for the desired video clip before it is found. As a result, productivity may decrease and the overall user experience may be frustrating.

SUMMARY

Systems, methods, and computing devices are provided for viewing scene-granular video based on geographical location. The computing device may include a memory configured to store video and geographical coordinates at which the video was captured. The computing device may further include a processor that is configured to execute a video path viewing program, and a display that is configured to display a graphical user interface of the video path viewing program. The graphical user interface may be configured to display a path graphic spatially representing the geographical coordinates along which the video was captured, a location selector that is selectively movable along the path graphic to a selected path location, and a video icon that is configured to display a preview of a portion of the video corresponding to the selected path location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
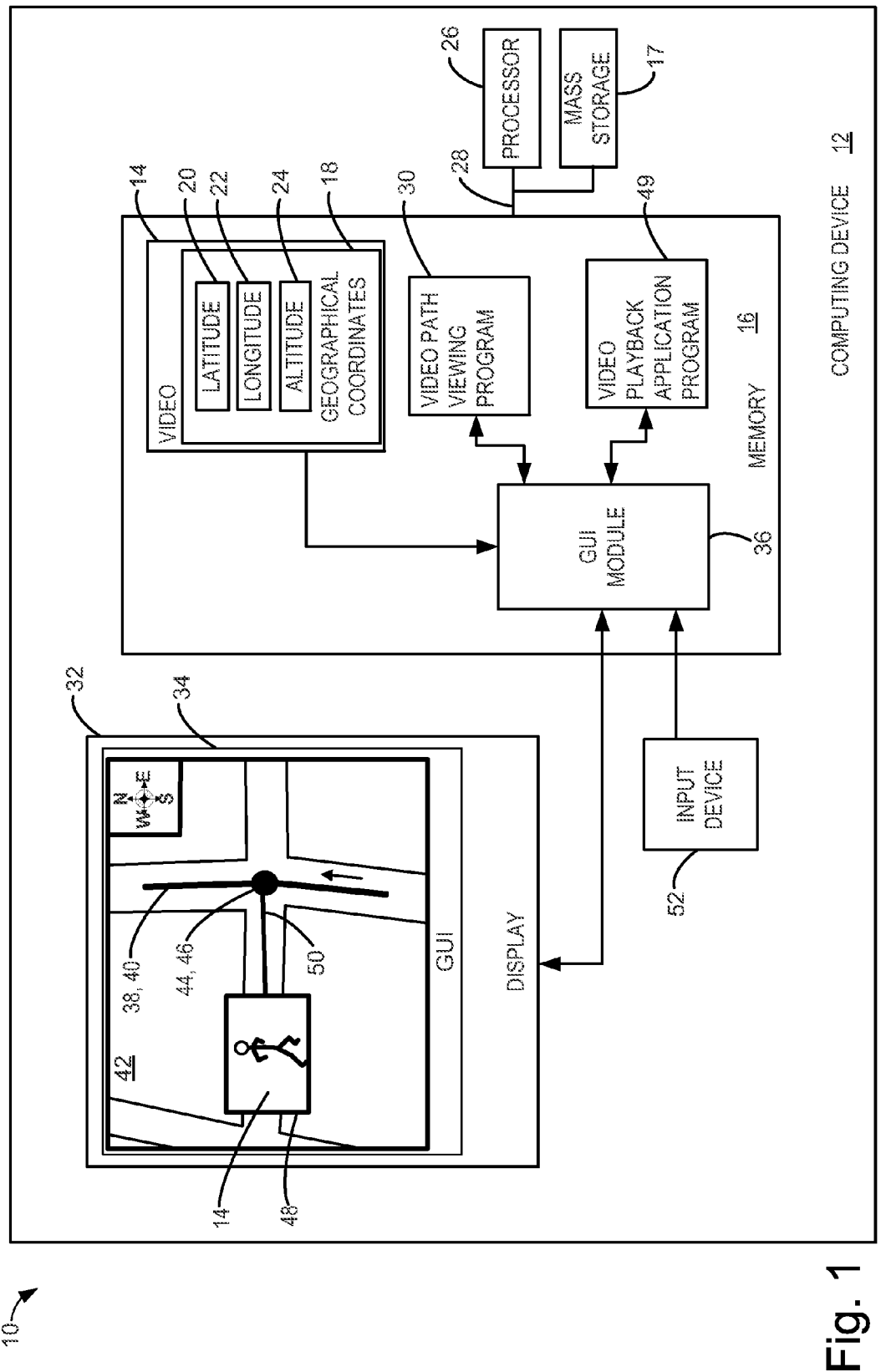
FIG. 1 is a schematic view illustrating a system for viewing video based on geographical location.

FIG. 1 illustrates a system 10 that may include a computing device 12 for viewing video 14 based on geographical location. The computing device 12 may include a memory 16 configured to store the video 14. The memory 16 may also be configured to store geographical coordinates 18 at which the video 14 was captured. It will be appreciated that the video 14 and geographical coordinates 18 may be loaded into memory 16 from a mass storage 17, for example. A processor 26 may be coupled with the memory 16 via, for example, a bus 28, and may be configured to execute a video path viewing program 30. The video path viewing program 30 may be resident in the memory 16. A display 32 may be coupled with the memory 16, and may be configured to display a graphical user interface (GUI) 34 of the video path viewing program 30. The memory 16 may include a GUI module 36 configured to cause the graphical user interface 34 to be displayed on the display 32. The GUI module 36 may, for example, be an application programming interface (API) component.

The video 14 may be encoded with metadata to identify the geographical coordinates 18. The geographical coordinates 18 may include latitude 20 and longitude 22, and in some embodiments may include altitude 24, or other identifying information. One type of metadata that may be utilized to identify the geographical coordinates 18 may be referred to as a geovector.

The GUI 34 may be configured to display a path graphic 38 spatially representing the geographical coordinates 18 along which the video 14 was captured. The path graphic 38 may include a line 40 substantially connecting the geographical coordinates 18, and may be determined by the video path viewing program 30, using the geographical coordinates 18. The path graphic 38 may be displayed on a map 42 of a surrounding geographic area. The path graphic 38 may be depicted in various ways as described below, and as illustrated in FIGS. 3A-3E.

Continuing with FIG. 1, the graphical user interface 34 may include a location selector 44 that may be selectively movable along the path graphic 38 to a selected path location 46, and a video icon 48 configured to display a preview of a portion of the video 14 corresponding to the geographical coordinates 18 of the selected path location 46. A video playback application program 49 may also be resident in the memory 16, and may be configured to play the preview of the video 14. The video icon 48 may include a window in which the video 14 may be played. The location selector 44 may be a grabbable graphical user interface element referred to as a "handle" located along the path, but alternatively may be a grabbable handle coextensive with or located proximate to the video icon 48, or located at another position that visually corresponds to the path. Thus, in some embodiments the video icon 48 may also function as the movable location selector 44.

Accordingly, a location selector movement may be effected by a corresponding icon movement of the video icon. The location selector 44 or the video icon 48, or both, may be selectively grabbable with an input device 52, such as a computer mouse, or the like, which may be coupled with the GUI module 36. The video icon 48 and the location selector 44 may be linked by a graphical linking element 50 which may graphically illustrate a correspondence between the geographical location and the video 14.

Figure 2A:
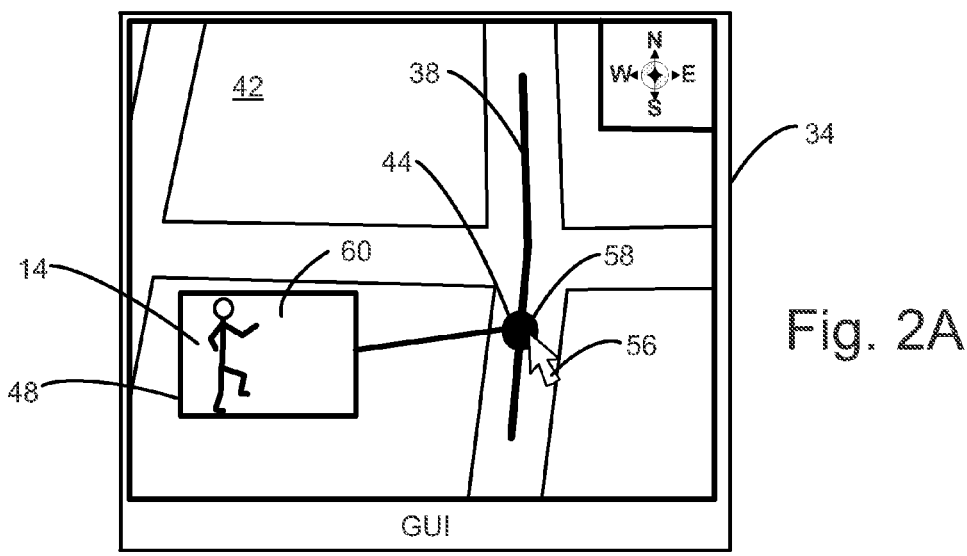
FIGS. 2A-2C are schematic views illustrating a graphical user interface of the system of FIG. 1, showing a scene granular view of a video based on the geographic location of the video's capture.
Figure 2B:
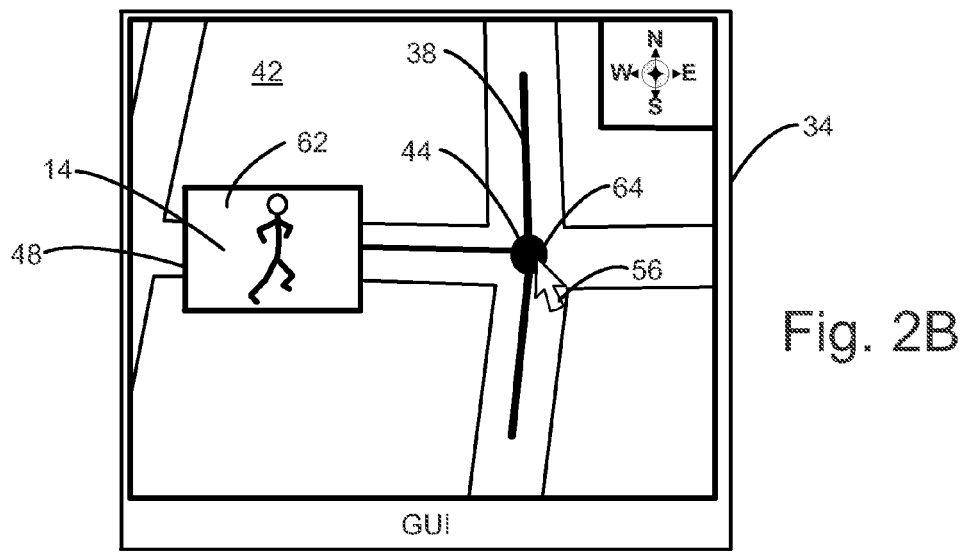
Figure 2C:
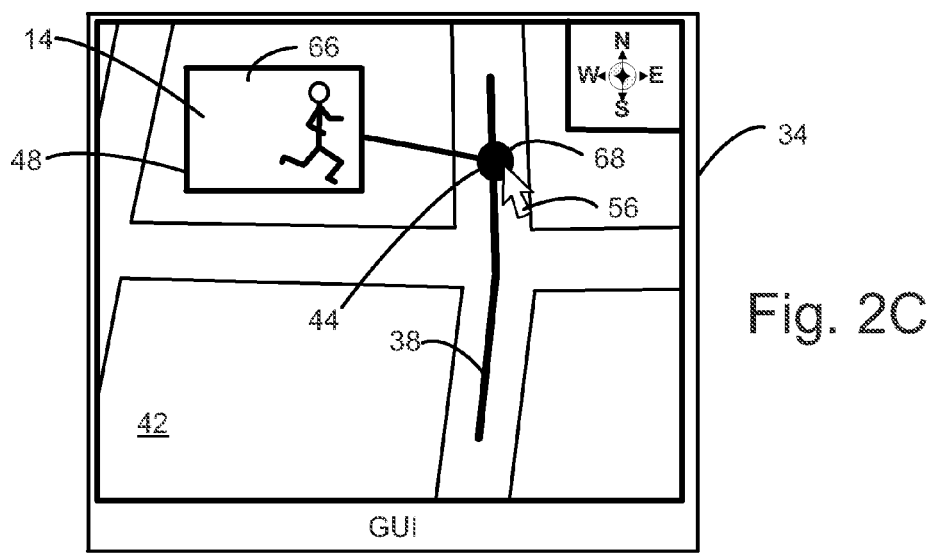

FIGS. 2A, 2B and 2C are schematic views illustrating three instantiations of the graphical user interface 34 showing a scene granular view of the video 14 based on the geographic location of where the video 14 was captured. In FIG. 2A the location selector 44 may be grabbed as illustrated with, for example, an arrow shaped cursor 56 at a first geographical location 58. The movement of cursor 56 may be determined by a corresponding movement of the input device 52 shown in FIG. 1. The video icon 48 may display a first frame 60 of the video 14, which may correspond to the first geographical location 58. FIG. 2B illustrates a second frame 62 of the video 14 which may correspond to a second geographical location 64, and FIG. 2C illustrates a third frame 66 of the video 14 which may correspond to a third geographical location 68. Three frames of the video 14, and three respectively corresponding geographical locations, are illustrated. In practice, a continuum of frames and a respective continuum of corresponding geographical locations may be displayed. The user may drag, or move, the location selector 44, using the cursor 56, to advance, or reverse, a playback of the video 14. The playback may also be accelerated or decelerated depending on how quickly the user moves the location selector 44. The video 14 may be a relatively small-sized version of the video clip, and may be displayed in a thumbnail format having a reduced pixel count. In some embodiments, the video icon 48 may remain stationary as the location selector is moved.

The preview displayed by the video icon 48 may be selected from the group consisting of a still frame, a continuous loop, and a one-time playback. The video icon 48 may also, or instead, be configured to scroll through frames of the video as the location selector 44 is moved along the path graphic 38. The video icon 48 may also, or instead, be configured such that when a user performs a predetermined action, such as double-clicking the video icon 48, a full-sized version of the video begins playing. Alternatively, the video icon 48 may be selectively movable within the GUI 34, and may be configured to scroll through frames of the video as the video icon is moved within the GUI.

Embodiments may provide one or more search visualizations for videos 14 saved in the memory 16. A user may be able to leverage the geographical coordinates 18 stored with the video to intuitively, and quickly, find scenes the user is interested in. The user may be more likely to remember the location that a particular scene was recorded in versus a filename of the video 14, or a corresponding file location in the memory 16. For example, a user who recorded his son building a sand castle at Juanita beach in Kirkland, Washington two years ago may remember that the event occurred at Juanita beach, but may not remember the name of the video file, or where within the file the scene is recorded, or the file's location in the memory 16. Accordingly the user may enter a geographic location into the GUI 34 to narrow the search for scenes that take place within a selected radius of the geographic location.

A number of video icons 48 may be displayed on the GUI 34 that may correspond to a number of video files that may have been captured at the same, or in some cases, at a nearby, geographical location. The user may then select one video icon 48, and may either move the location selector, or the video icon 48, to review portions of the video to ascertain if the video clip is the one the user is looking for. The file holding the video clip may include other clips that may or may not have been captured at the same geographical location.

The map 42, displayed on the GUI 34, may be an interactive map 42 of the geographic area that may be configured to be zoomed into, and zoomed out of, and panned through. Zooming in may serve to help the user eliminate certain video clips as clips the user is not looking for as the user begins to recollect a more exact location of the video 14 capture. As the user zooms in, and the granularity of the search is increased, video icons 48 of non-sought video clips may "fall off" the GUI 34. Also, as the user zooms in, the particular portion(s) of the video 14 that may be part of a larger video file may be easier to locate by providing a scene granular visualization of the video 14 based on geographical location.

FIGS. 3A through 3E are schematic representations of various path graphics 38. The line 40 may include a line characteristic 70 graphically distinguishing a temporal start 70A from a temporal end 70B of the path graphic 38. The line characteristic 70 may be selected from color, thickness, pattern, textual identifier, and arrows, for example. In the case of the line characteristic 70 being a color, the line 40 may be, for example, a first color at or adjacent to the temporal start 70A, and may be one or more other colors along the line 40, and more proximate to the temporal end 70B of the line 40. The line may, for example, include a recognizable series of colors, such as colors of the rainbow (e.g. red, orange, yellow, green, blue, violet), or other differentiable color scheme.

Figure 3A:
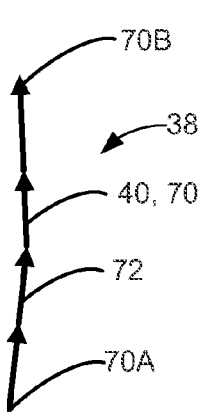
FIGS. 3A through 3E are schematic representations of various path graphics that may be displayed in the graphical user interface of FIG. 1.
Figure 3B:
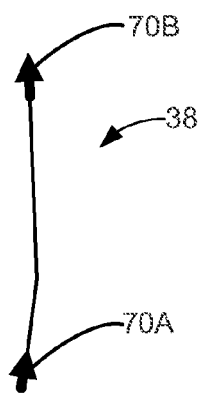
Figure 3C:
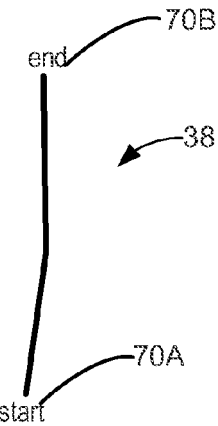
Figure 3D:
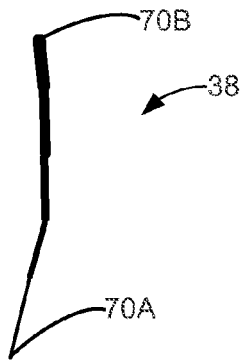
Figure 3E:
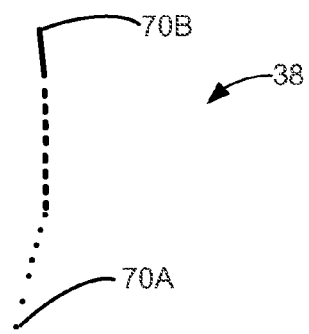

Various examples of distinguishing temporal start 70A from temporal end 70B of a path graphic 38 follow. FIG. 3A indicates an example path graphic 38 including arrows 72 indicating the direction the location selector 44 is to be moved in order to temporally advance the video 14. The temporal start 70A and the temporal end 70B may be inferred from the respective tail of the first arrow and head of the last arrow 72. FIG. 3B indicates an example path graphic 38 indicating the temporal start 70A and the temporal end 70B with relatively large visually distinguishable arrows. FIG. 3C indicates an example path graphic 38 indicating the temporal start 70A and the temporal end 70B with the respective textual identifiers "start" and "end". FIG. 3D indicates an example path graphic 38 indicating the temporal start 70A, and the temporal end 70B and the position along the line segments of varying thickness. FIG. 3E indicates an example path graphic 38 indicating the temporal start 70A, from the temporal end 70B with line segments 56 of varying patterns, such as indicated with dotted and dashed lines.

Where appropriate, the line characteristic 70 may have segments that may include graphical indication of the length and temporal position of the video 14, for example the segments may be various lengths, each varying length indicating graphically the total length of the video clip. For example, longer segments may indicate longer total length of video clip.

Figure 4:
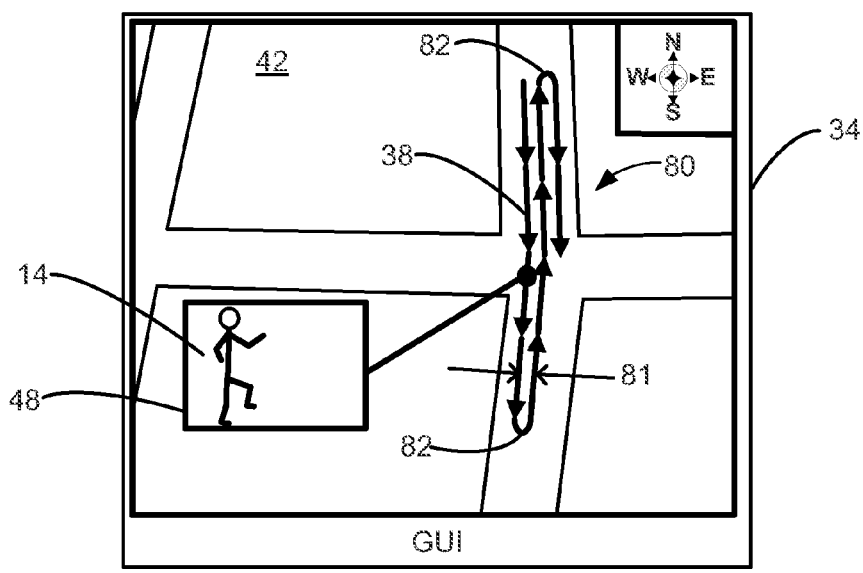
FIG. 4 is a schematic view illustrating the graphical user interface with overlapping geographic coordinates, which are temporally separated.

FIG. 4 is another schematic view illustrating the GUI 34. The path graphic 38 may include an overlapping path characteristic 80 graphically representing overlapping geographical coordinates along which the video 14 was captured but which may be temporally separated. The overlapping path characteristic 80 may be an overlapping line with switchback indicators 82, illustrating a continuous but overlapping path graphic 38. The switchback indicators 82 may be, for example, arcs, or the like, as illustrated. The actual geographical locations may overlap, but the overlapping portions may be offset by a predetermined amount 81 to graphically illustrate an overlapping situation.

Figure 5:
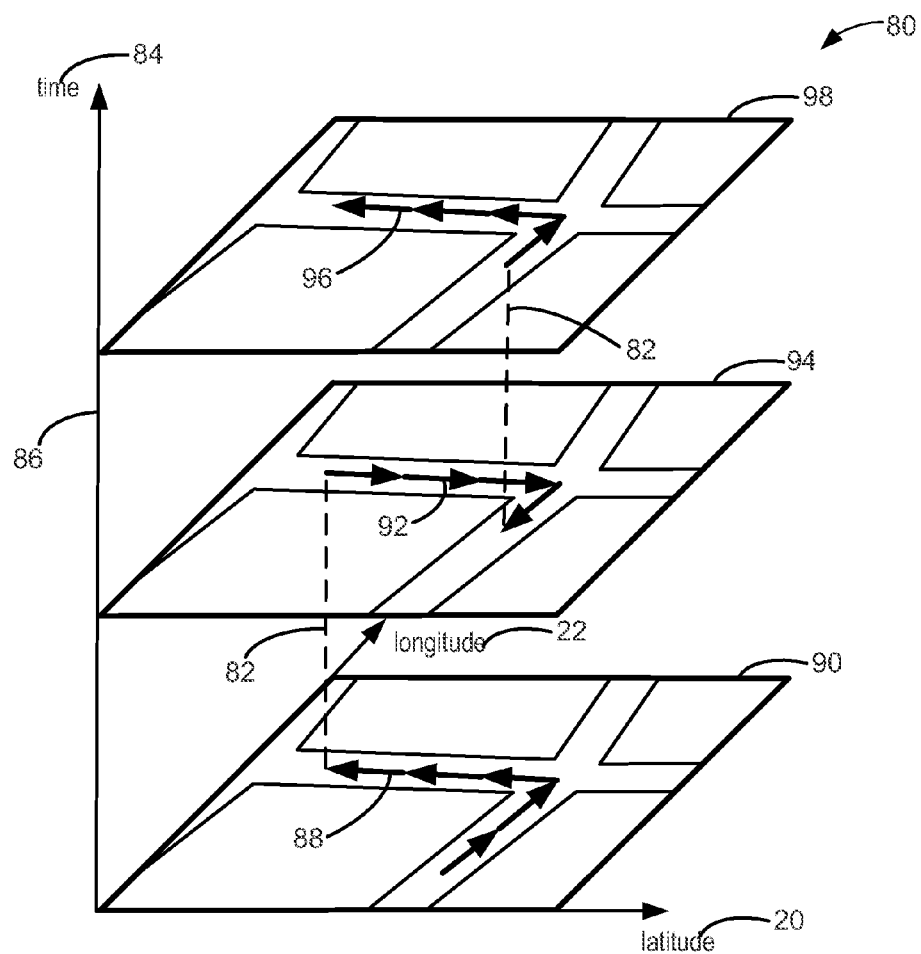
FIG. 5 is a schematic view illustrating the graphical user interface with a time axis that is orthogonal to a latitude axis and a longitude axis.

FIG. 5 is another schematic view illustrating another example overlapping path characteristic 80 in an exploded fashion with time 84 represented along an axis 86, displayed normal to respective axes illustrating latitude 20 and longitude 22. A first overlapping path portion 88 may be illustrated on a first plane 90; a second overlapping path portion 92 may be illustrated on a second plane 94; and a third overlapping path portion 96 may be illustrated on a third plane 98.

Figure 6:
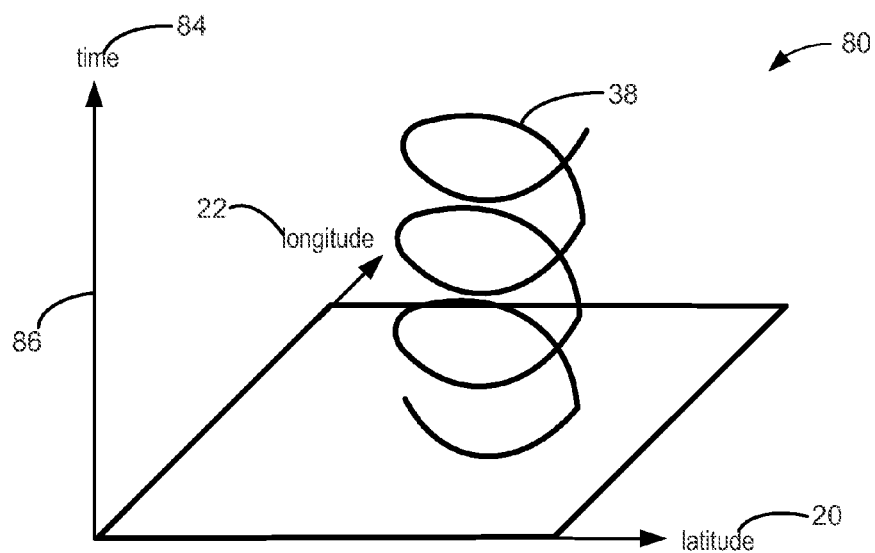
FIG. 6 is another schematic view illustrating the graphical user interface with a time axis that is orthogonal to a latitude axis and a longitude axis.

FIG. 6 is another schematic view illustrating another example overlapping path characteristic 80. The overlapping path characteristic 80 may be illustrated in a coordinate system similar to that illustrated in FIG. 5, wherein the path graphic 38 shows spatial and temporal movement of the geographical coordinates 18 at which the video 14 was captured.

Figure 7:
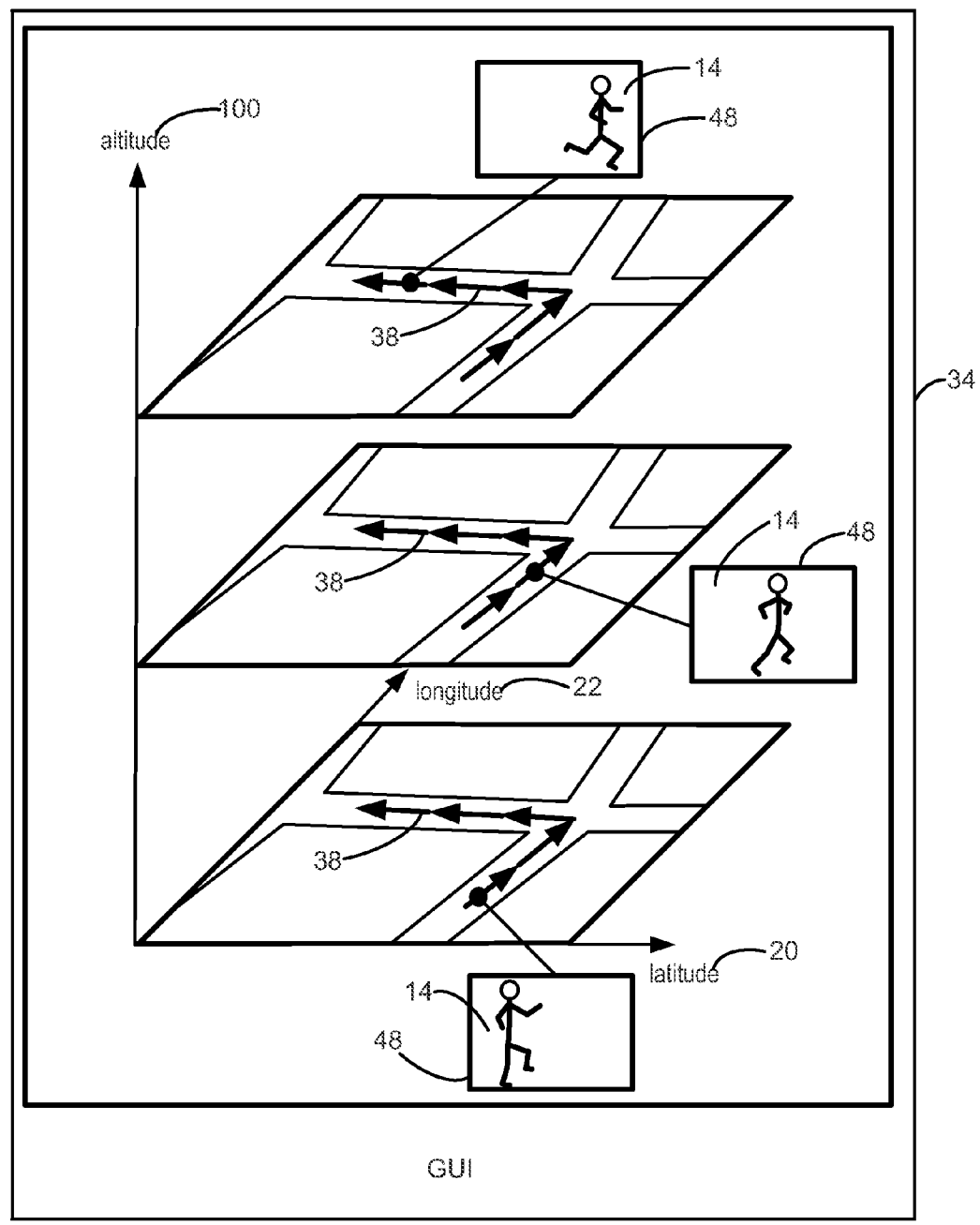
FIG. 7 is a schematic view illustrating the graphical user interface with an altitude axis that is orthogonal to a longitude axis and a latitude axis.

FIG. 7 is another schematic view illustrating the GUI 34. The geographical coordinates of latitude 20, and longitude 22, may further include an altitude 100 at which the video 14 was captured. The path graphic 38 may be a three dimensional graphical representation of the latitude, longitude, and altitude. The example illustrated may display a video 14 within the video icon 48 of a person walking or running up a hill. While three separate longitude-latitude planes are illustrated in FIG. 7, it will be appreciated that a continuous three-dimensional terrain map may alternatively be displayed, and the users geographical location, including latitude, longitude, and altitude, may be displayed on the three-dimensional terrain map.

Figure 8:
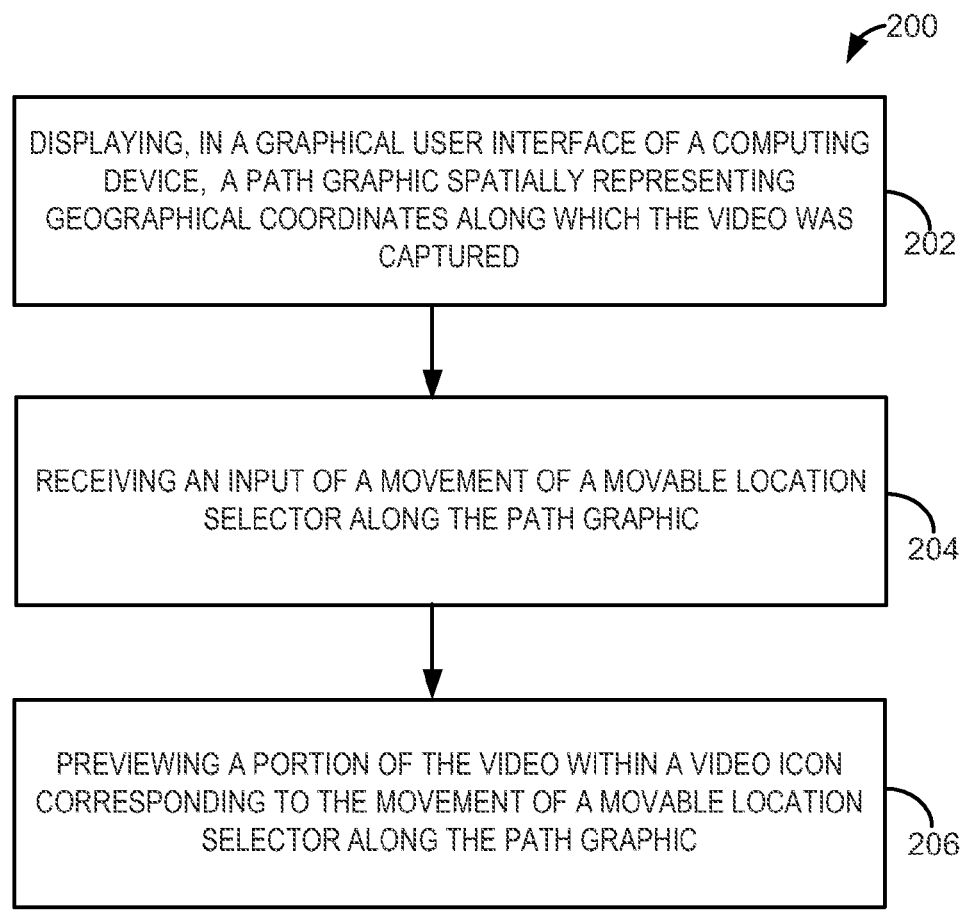
FIG. 8 is a flowchart illustrating one embodiment of a method for viewing video based on geographical location.

FIG. 8 is a flowchart illustrating an embodiment of a method 200 for viewing video based on geographical location. Method 200 may be implemented using systems and devices described above, or using other suitable hardware and software. The method 200 may include, at 202, displaying, in a graphical user interface of a computing device, a path graphic spatially representing geographical coordinates along which the video was captured. At 204, the method may include receiving an input of a movement of a movable location selector along the path graphic. At 206, the method may also include previewing a portion of the video within a video icon corresponding to the movement of a movable location selector along the path graphic. Some embodiments may provide a method 200 that may further include displaying the path graphic on a map of a geographic area including the geographical location. The method 200 may also include linking the video icon and the location selector with a graphical linking element.

The receiving of an input of the movement of the movable location selector along the path graphic, as illustrated at 204, may be effected by a corresponding movement of the video icon. The previewing, illustrated at 206, may be accomplished at least in part by displaying a still frame, playing a continuous loop, and/or playing a one-time playback. In addition, or alternatively, the previewing may include scrolling through frames of the video corresponding to the receiving an input of a movement of the movable selector along the path graphic.

Some embodiments may provide a method 200 wherein the video was captured along an overlapping path that includes overlapping geographical coordinates that are temporally separated, the method further comprising graphically representing the overlapping path with an overlapping path characteristic of the path graphic.

The above described systems and methods may be used to efficiently locate video based on geographic location at which the video was captured, potentially increasing user productivity and augmenting the user experience.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, enhanced mobile telephone device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

What is claimed is:

1. A computing device for viewing image frames based on geographical location, the computing device comprising:
   memory configured to store the image frames and geographical coordinates at which the image frames were captured;
   a processor configured to execute a path viewing program; and
   a display configured to display a graphical user interface of the path viewing program, wherein the graphical user interface is configured to display:
   a path graphic spatially representing a path linking the geographical coordinates along which the image frames were captured, the path graphic including first and second spatially offset portions, the first and second spatially offset portions being displayed as offset despite representing overlapping geographic coordinates to represent a first subset of the image frames that were captured on the first spatially offset portion and a second subset of image frames that were captured on the second spatially offset portion, wherein the first and second spatially offset portions are connected with a switchback indicator indicating that the path graphic is continuous.

2. The computing device of claim 1, wherein the first and second spatially offset portions were captured at different points in time.

3. The computing device of claim 1, wherein the path graphic comprises a line that includes a line characteristic graphically distinguishing a temporal start from a temporal end of the path graphic, the line characteristic being selected from color, thickness, pattern, textual identifier, and arrows.

4. The computing device of claim 1, wherein the geographical coordinates include latitude and longitude, and the path graphic is a two dimensional graphical representation of the latitude and longitude.

5. The computing device of claim 1, further comprising:
a location selector being selectively movable along the path graphic to a selected path location; and
an icon configured to display one of the image frames corresponding to the selected path location, wherein the icon and the location selector are linked by a graphical linking element.

6. The computing device of claim 5, wherein the icon is configured to scroll through the image frames as the location selector is moved along the path graphic.

7. The computing device of claim 1, wherein the first spatially offset portion is displayed on a first plane, and the second spatially offset portion is displayed on a second plane that is spatially offset from the first plane.

8. The computing device of claim 1, wherein the first and second spatially offset portions are displayed in a continuous spiral.

9. A method for viewing image frames based on geographical location comprising:
displaying, in a graphical user interface of a computing device, a path graphic spatially representing a path linking geographical coordinates along which the image frames were captured, the path graphic including first and second spatially offset portions, the first and second spatially offset portions being displayed as offset despite representing overlapping geographic coordinates to represent a first subset of the image frames that were captured on the first spatially offset portion and a second subset of image frames that were captured on the second spatially offset portion, wherein the first and second spatially offset portions are connected with a switchback indicator indicating that the path graphic is continuous;
receiving an input of a movement of a movable location selector along the path graphic; and
previewing the image frames within an icon corresponding to the movement of a movable location selector along the path graphic.

10. The method of claim 9, wherein the first and second spatially offset portions were captured at different points in time.

11. The method of claim 9, wherein the path graphic comprises a line that includes a line characteristic graphically distinguishing a temporal start from a temporal end of the path graphic, the line characteristic being selected from color, thickness, pattern, textual identifier, and arrows.

12. The method of claim 9, wherein the geographical coordinates include latitude and longitude, and the path graphic is a two dimensional graphical representation of the latitude and longitude.

13. The method of claim 9, further comprising:
receiving an input of a movement of a movable location selector along the path graphic to a selected path location; and
displaying via an icon one of the image frames corresponding to the selected path location, wherein the icon and the location selector are linked by a graphical linking element.

14. The method of claim 13, wherein the icon is configured to scroll through the image frames as the location selector is moved along the path graphic.

15. The method of claim 9, further comprising:
displaying the first spatially offset portion on a first plane; and
displaying the second spatially offset portion on a second plane that is spatially offset from the first plane.

16. The method of claim 9, further comprising displaying the first and second spatially offset portions in a continuous spiral.

17. A system for viewing image frames based on geographical location, the system comprising:
memory configured to store the image frames and geographical coordinates at which the image frames were captured;
a processor configured to execute a path viewing program; and
a display configured to display a graphical user interface of the path viewing program, wherein the graphical user interface is configured to display:
a path graphic spatially representing a path linking the geographical coordinates along which the image frames were captured, the path graphic including first and second spatially offset portions, the first and second spatially offset portions being displayed as offset despite representing overlapping geographic coordinates to represent a first subset of the image frames that were captured on the first spatially offset portion and a second subset of image frames that were captured on the second spatially offset portion, wherein the first and second spatially offset portions are connected with a switchback indicator indicating that the path graphic is continuous; and
an icon being selectively movable within the graphical user interface and configured to scroll through the image frames as the icon is moved within the graphical user interface.

18. The system of claim 17, wherein the first spatially offset portion is displayed on a first plane, and the second spatially offset portion is displayed on a second plane that is spatially offset from the first plane.

* * * * *